United States Patent Office 3,623,266
Patented Nov. 30, 1971

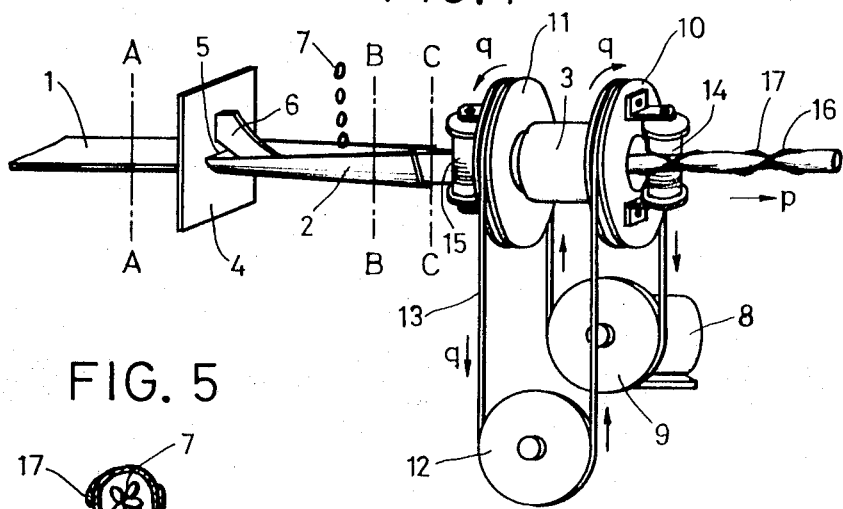
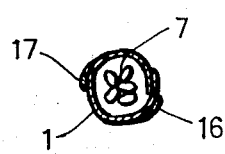
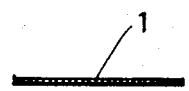
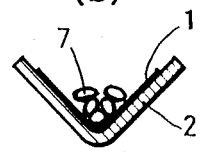
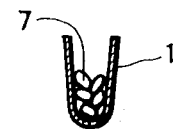
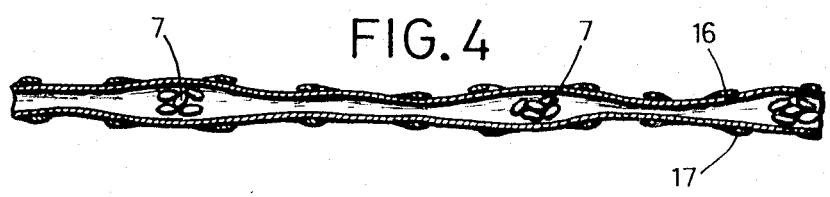

3,623,266
SEED TAPE FOR SEEDING
Masakazu Nakayama, Tokyo, Japan, assignor to Toei Sangyo Company Limited, Tokyo, Japan
Filed Mar. 31, 1970, Ser. No. 24,157
Int. Cl. A01c 1/04
U.S. Cl. 47—56                                    2 Claims

ABSTRACT OF THE DISCLOSURE

The seed tape of this invention consists of a tape being soluble or decomposed in water, in which plant seeds are wrapped at certain intervals and the outside of which is bound with at least two strings wound helically in opposite directions.

---

This invention relates to seed tape for seeding. For instance, in the case of paddy cultivation, a method of growing seedings in a nursery bed and transplanting them into a paddy field has conventionally been employed. Recently, however, a method of improving the efficiency of cultivation by direct seeding in a paddy field is being adopted. In such a case, if one used tapes consisting of water-soluble tapes with paddy field in parallel at proper intervals, weeding, etc. at a later date will be facilitated and at the same time, yield can be increased.

This invention relates to the structure of a seed tape as mentioned above. Conventionally employed are paper or synthetic resin tapes, etc. on which one places paddy seeds at certain intervals, puts one edge of tape upon the other and glues them together, with a string being stretched, as required for the purpose of reinforcement, in parallel to and inside the tape.

However, such type of a seed tape has the disadvantages that paddy seeds move in the inside resulting in irregular seed intervals and in addition, it takes much time to dry the glued tape edges, making it impossible to produce the tapes efficiently.

The object of this invention is to provide seed tapes which would not be cut off when drenched with water and which can be manufactured efficiently.

In the accompanying drawings:
FIG. 1 is a perspective view showing an example of the process of manufacture of seed tapes of the invention;
FIGS. 2(a), 2(b) and 2(c) are sectional views of the parts A, B and C of FIG. 1 respectively;
FIG. 3 is a front view of an embodiment of this invention;
FIG. 4 is a longitudinal sectional view of FIG. 3;
FIG. 5 is a transverse sectional view of FIG. 3.

This invention will now be described in detail by reference to the attached drawings, FIG. 1 is a perspective view showing an example of manufacturing conditions of the seed tape of this invention, that is, a tape 1 made of a material such as proper synthetic resin being easily soluble in water or paper being easily decomposed by water is passed through a guide conduit and center holes of binding device 3, causing it to travel in the direction of arrow p. The guide conduit 2 is nearly V-shaped, whose depth increases progressively from the left end towards the right end. Further, this guide conduit 2 is fitted in a rectangular opening 5 of a supporting plate 4 with a holding rod 6 being provided above the rectangular opening 5. Accordingly, as the tape 1 travels in the abovementioned direction, it is gradually bent in the form of V and then U as shown in FIGS. 2(a), (b) and (c). Above the center of such guide conduit 2 is provided a paddy seed feed device, though not shown in the drawings, from which several grains of paddy seed 7 are dropped intermittently at certain intervals of time and such paddy seeds 7 are arranged at certain intervals on the tape 1. The binding device 3 comprises a drive pulley 9 connected to a motor 8, pulleys 10, 11 for binding and a floating pulley 12, on which a belt 13 is stretched, with spools 14, 15 being so mounted on the side of pulleys 10, 11 as to be able to revolve with proper friction.

Accordingly, if one binds the top of the tape 1 with strings of the spools 14, 15 and starts running, pulleys 10, 11 and belt 13, etc. revolve or travel in the direction of arrow q. That is, simultaneously with travel of the tape 1, the spools 10, 11 revolve in opposite directions and strings 16, 17 are wound helically in opposite directions round the outside of the tape 1 bent in the shape U as described above. FIGS. 3–5 are front, longitudinal and transverse sectional views respectively, of a seed tape made by wrapping paddy seeds 7 at certain intervals in the tape 1 in this way and further binding it by winding at least 2 strings 16, 17 round the outside thereof helically and in opposite directions.

As above, the seed tape of this invention consists of the tape 1 being soluble or decomposed in water, in which plant seeds 7 are wrapped at certain intervals and the exterior of which is bound with at least two strings 16, 17 wound helically and in opposite directions. Accordingly, the wrapped-in seeds 7 are clamped on both sides by the strings 16, 17 circumferentially and therefore there is no possibility of the seeds moving within the tape during storage, transport, seeding or cultivation, etc. For this reason, it is possible to perform seeding in a paddy field, etc. accurately at certain intervals. In addition, as the tape is bound with more than 2 strings helically and in opposite directions, it has a great strength in its longitudinal direction and moreover, loosening of binding due to twist of the seed tape is thus prevented. Further, this invention has excellent advantages that when drenched with water at the time of seeding, etc., the tape would not be cut off easily and in addition, as no water or paste is applied, a drying process, etc. is not required and the tape can be produced efficiently.

What is claimed is:
1. Seed tape for seeding comprising a generally tubular tape made of a material soluble in water, plant seeds in said tubular tape at spaced intervals therealong and at least two water insoluble strings wound round the outside of said tubular tape helically and in opposite directions, said strings being sufficiently taut about said tubular tape to sequentially restrict said tubular tape at points between said seeds, whereby seed movement is prevented.
2. Seed tape for seeding according to claim 1, wherein said material soluble in water is paper.

References Cited
UNITED STATES PATENTS

| | | | |
|---|---|---|---|
| 614,002 | 11/1898 | Jenkins | 47—56 |
| 2,338,103 | 1/1944 | Fischer | 47—56 |
| 2,601,620 | 6/1952 | Marshall | 47—56 X |
| 2,826,865 | 3/1958 | Chohamin | 47—56 |
| 3,328,916 | 7/1967 | Okita et al. | 47—56 |

FOREIGN PATENTS

| | | |
|---|---|---|
| 246,389 | 1/1925 | Canada. |

ROBERT E. BAGWILL, Primary Examiner

U.S. Cl. X.R.
206—46 P; 53—28, 180